United States Patent
Jones et al.

[15] 3,666,769

[45] May 30, 1972

[54] THERMALLY STABLE 2-PERFLUORO-SUBSTITUTED BENZOTHIAZOLES

[72] Inventors: Frank N. Jones, Wilmington; Ronld D. Richardson, Claymont, both of Del.

[73] Assignee: E. I. du Pont de Nemours and Company, Wilmington, Del.

[22] Filed: Oct. 9, 1969

[21] Appl. No.: 865,204

[52] U.S. Cl. .................................260/304, 252/475, 252/67, 252/78
[51] Int. Cl. .........................................C07d 91/44
[58] Field of Search....................................260/304

[56] References Cited

UNITED STATES PATENTS 3,513,237   5/1970   Manning et al. ........................260/304

OTHER PUBLICATIONS

Braz et al., Chem. Abstracts, 63:5622 (1965)
Yagupolski et al., Zh. Obsch. Khim. 36 (11) 1983- 1987 (1966)
Yagupolski et al., Zh. Obsch. Khim. 37 1798 (1967)

*Primary Examiner*—Alex Mazel
*Assistant Examiner*—R. J. Gallagher
*Attorney*—James H. Ryan

[57] ABSTRACT

Certain substituted benzothiazoles having in their 2-position a perfluoroalkyl, perfluoroaryl, perfluoro(alkoxyalkyl) perfluoro(aryloxyalkyl) or a polyoxyperfluoroalkylene substituent free of either olefinic or acetylenic unsaturation are very stable to high temperatures and are useful as turbine fluids, hydraulic fluids, lubricants, solvents and heat-transfer fluids. These new compounds can be made by a reaction of o-aminothiophenols or with a perfluoroacid fluoride, followed by cyclization.

6 Claims, No Drawings

THERMALLY STABLE 2-PERFLUORO-SUBSTITUTED BENZOTHIAZOLES

BACKGROUND OF THE INVENTION

This invention relates to new, heat-stable substituted benzothiazoles useful in many areas of modern technology in which the efficiency of extraction and transfer of energy is increased by operation at high temperature. Among the numerous devices in this area are jet engines, turbine engines, and nuclear power plants.

Practical operation of these modern machines requires lubricating and heat transfer fluids of exceptional physical and chemical stability, but especially of high heat stability.

SUMMARY OF THE INVENTION

Accordingly, it has now been discovered that certain substituted benzothiazoles have a very high thermal stability and are, therefore, useful in a variety of high temperature applications. The new compounds can be represented by the generic formula

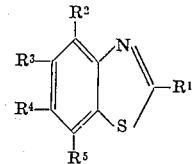

in which $R^1$ is perfluoroalkyl, perfluoroaryl, perfluoro(alkoxyalkyl) or perfluoro(aryloxyalkyl) of two to 12 carbon atoms; or polyoxyperfluoroalkylene in which the perfluoroalkylene unit can be linear or branched and has two to three carbon atoms, the number of such units being no more than about 100 when they contain two carbons and no more than about 50 when they contain three carbons. $R^1$ is free of either olefinic or acetylenic unsaturation. $R^2$, $R^3$, $R^4$ and $R^5$ each independently can be hydrogen, a halogen atom, a $C_1$-$C_{12}$ alkyl, or a $C_1$-$C_6$ alkoxy group; $R^2$ also can be the amino group, and $R^4$ can also be a $C_4$-$C_7$ cycloalkyl, phenyl, lower alkylphenyl, halophenyl, carboxyl, the cyano group, an acylamido group, a di-$C_1$-$C_6$-alkylamino group, the nitro group, or the cyanomethyl group. The above new thiazoles can be prepared by methods similar to those reported in literature for known benzothiazoles.

DETAILED DESCRIPTION OF THE INVENTION

All the new thiazoles of this invention have a perfluorinated substituent $R^1$ in the 2-position. This substituent can be either a simple low molecular weight group or an oligomer or even a polymer. Representative $R^1$ substituents include -$C_2F_5$, -$C_3F_7$, iso-$C_3F_7$, -$C_7F_{15}$, -$C_6F_5$, cyclo—$C_4F_7$, —$CF(CF_3)OC_6F_5$, — $CF(CF_3)[OCF_2CF(CF_3)]_nOCF_2CF_2CF_3$, where $n$ is, for example, 1–10, and —$CF_2[OCF_2CF_2]_nOCF_2CF_3$, where $n$ is, for example, 1–10. Oligomeric and polymeric polyoxyperfluoroalkylene substitutents $R^1$ are introduced by a reaction of a suitable o-aminothiophenol or o-aminothionaphthol with a condensation product of perfluoroethylene oxide or perfluoropropylene oxide. These condensation products have the following respective formulas:
$CF_3CF_2[OCF_2CF_2]_nOCF_2COF$ and $CF_3CF_2CF_2[OCF(CF_3)—CF_2]_nOCF(CF_3)COF$, where $n$ is an integer and can have a value of about 1–100 in the case of perfluoroethylene oxide or about 1–50 in the case of perfluoropropylene oxide.

Representative $R^2$, $R^3$, $R^4$, and $R^5$ substituents include methyl, propyl, butyl, hexyl, benzyl, dodecyl, chlorine, bromine, fluorine, iodine, methoxy, ethoxy, propoxy, butoxy, pentoxy and hexoxy. $R^4$ can also be for example one of the following groups: cyclobutyl, cyclohexyl, cycloheptyl, tolyl, xylyl, ethylphenyl, chlorophenyl, bromophenyl, acetamide, propionamido, benzamido dimethylamido, diethylamino, dibutylamino, and dihexylamino group.

PREPARATION OF THE NEW COMPOUNDS

The compounds of this invention are prepared by procedures similar to those described in the art. A review of classical thiazole and benzothiazole chemistry is given by J. M. Sprague and A. H. Land in Elderfield, "Heterocyclic Compounds," Vol. 5, John Wiley & Sons, Inc., New York, 1957, p. 484. One convenient synthesis of the compounds of this invention is realized by the following reaction sequence.

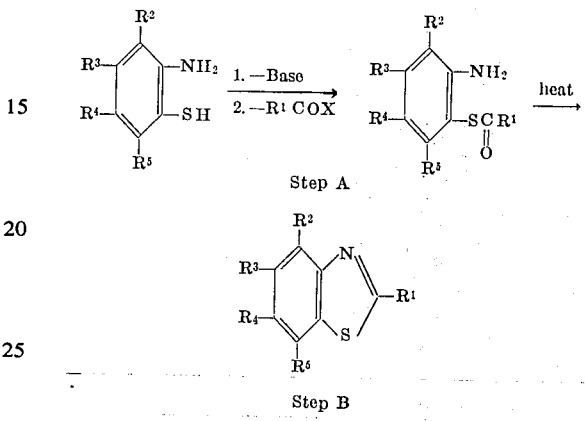

Step A

Step B

X can be a halogen or an alkoxy, aryloxy, mercapto, or acyloxy group. Starting compounds in which X is Cl or F are preferred because of their ready availability.

CONDITIONS FOR CONDENSATION OF STEP A

Use of an equivalent amount of base in Step A is optional, but it improves yields. Any tertiary amine or phosphine or an inorganic base can be used. Preferably, the conjugate acid of the base should have a pK of 12 or lower.

It is not essential to use a solvent; however, polar, aprotic, organic solvents such as ethers, dimethyl formamide, pyridine, etc. or nonpolar solvents such as hydrocarbons often are useful. Protonic solvents can react with $R^1COX$ in some cases, reducing yields. Water, however, sometimes is a desirable solvent, especially in the presence of inorganic bases.

The reaction temperatures vary within the range of about −150° to +200° C., −80° to +30° C. being preferred. At temperatures of 140° C. or higher, the cyclization Step B can occur without isolation of intermediate.

CONDITIONS FOR CYCLIZATION OF STEP B

The reaction can be effected by heating the intermediate aminoarylthioester at about 100°–500° C. The upper temperature limit depends on the thermal stability of the final product. Usually, this reaction is carried out about 150°–350° C., and preferably at 170°–280° C. The temperature range is chosen so as to give practical reaction times of about 5 minutes to 10 hours. Lower molecular weight intermediates can be cyclized in a continuous flow system with short contact times and high temperatures (300°–500° C.). It is desirable to carry out the cyclization in the absence of oxygen because of the sensitivity of the intermediate aminothioesters to oxygen at elevated temperatures.

Water formed during the cyclization step can be removed by distillation, by sweeping the reactor with a stream of inert gas, or by addition of a drying agent such as calcium sulfate or a molecular sieve. The water does not have to be removed if a reaction vessel which can withstand the pressure of water vapor is used. In some cases it may be desirable to use superheated steam as an inert gas to protect the reactants from oxygen.

The cyclization can be carried out in the presence of an inert solvent such as hydrocarbon, ether, chlorohydrocarbon or fluorohydrocarbon, preferably having a boiling point above about 100° C.

The compounds of this invention can also be prepared starting with preformed thiazoles. One synthesis is:

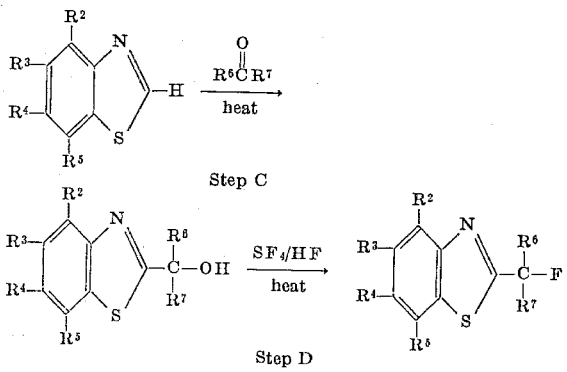

Step C

Step D in which $R^2$ to $R^5$ are as defined above, while $R^6$ and $R^7$ each can be F, or one can be F and the other one a radical of the same type as $R^1$ but having one carbon atom less. Step C of this synthesis can be carried out by heating the reactants at 50°–500 C., preferably at 100°–200° C. in a pressure vessel, preferably lined with a reactive nickel-based alloy such as Hastelloy C (Union Carbide Corp.). Reaction times vary in the range of about 0.1–20 hours. The reaction can be run in a flow system with contact times of 0.1–300 seconds and temperatures of 150°–500° C.

It is not necessary to isolate the intermediate thiazolyl carbinol, and most conveniently the two reaction steps are run in sequence. Following the Step C, the vessel is cooled, the sulfur tetrafluoride and hydrogen fluoride added, and Step D carried out. The latter can be run at about 50°–500° C., but preferably at 100°–200° C. for 0.1–20 hours.

Inert solvents can be used in the above synthesis.

STARTING MATERIALS

The 2-aminothiophenols used in synthesis are obtained by standard methods described in the chemical literature.

For example, synthesis of the zinc salts of the 2-amino-3-mercaptobiphenyl, 4-amino-3-mercaptotoluene and 4-amino-3-mercapto-1-ethoxybenzene is described in U. S. Pat. No. 2,454,260 (1948).

Many of the perfluoroacid halides, anhydrides and esters are commercially available. Others can be prepared by various routes, some of which are described by Lovelace, Rausch, and Postelnek, Organic Fluorine Compounds, Reinhold Publishing Co., New York, 1958, pp. 201–258.

The perfluoroether acid fluorides used to prepare higher molecular weight compounds are prepared by polymerizing or copolymerizing perfluoroepoxides such as tetrafluoroethylene oxide and hexafluoropropylene oxide as described in U. S. Pat. Nos. 3,125,599 and 3,322,826.

The preformed thiazoles suitable for use in synthesis II may be made by any of the methods described, such as those in Elderfield, previously cited. Certain substituents such as nitro and halo functions can be introduced into the benzothiazolyl group by reaction after the synthesis of 2-substituted benzothiazole. Alkyl substitutents in the benzene ring can be selectively oxidized to —CHO or —COOH groups.

This invention is now illustrated by the following examples of certain embodiments thereof.

EXAMPLE 1

2-Heptafluoro-n-propylbenzothiazole ($R'=CF_3CF_2CF_2-$; $R^2$-$R^5$ = H)

A. Butyllithium (80 mmoles) in hexane was added to a solution of 10.1 g. (80 mmoles) of o-aminothiophenol in 125 ml. of tetrahydrofuran at 0° C. A pale-yellow solid separated and perfluorobutryl chloride was added slowly. An exothermic reaction occurred. The temperature being controlled at 5°–10 ° C. by means of an ice bath. The solution was concentrated, taken up in methylene chloride/hexane mixture, filtered to remove salts and allowed to crystallize. There was produced 20.9 g. (67% yield) of white solid heptafluorobutyric acid ester of 2-aminobenzenethiol, m.p. 75°–77° C.

Anal. Calcd. for

| | | | |
|---|---|---|---|
| $C_{10}H_6F_7NOS$: | C, 37.4; | H, 1.9; | N, 4.4 |
| Found: | C, 37.2; | H, 4.16; | N, 4.4 |
| $F_{15}NS$: | C, 33.4; | H, 0.80; | N, 2.78 |

B. In a 500-ml round-bottom flask equipped with a magnetic stirrer was placed 66.6 g. (0.208 mole) of the product 1A. The flask was attached to a vacuum train having a 300 ml. U-trap cooled by liquid nitrogen. The system was evacuated to a pressure of about 0.1 mm. The stopcock leading to the U-trap was closed and the flask was surrounded by an oil bath heated to 190° C. Water and product began to boil in the system. These volatile products were intermittently removed by distillation into the U-trap. The less volatile 2-aminobenzenethioheptafluorobutyrate did not distill. This process was continued for several hours until virtually all material had distilled. A solution of the distillate in $CH_2Cl_2$ was washed in turn with 1N HCl and water, dried with $MgSO_4$, filtered and concentrated on a rotary evaporator at about 20 mm. to give 60 g. (95% yield) of colorless product. Fractionation through a spinning-band column gave 51.6 g. (82% yield) of 2-heptafluoro-n-propyl benzothiazole, b.p. 85° C. 6.5 mm., m.p. 19° C., 99.91% pure by gas-liquid partition chromatography.

Anal. Calcd. for

| | | | |
|---|---|---|---|
| $C_{10}H_4F_7NS$: | C, 39.6; | H, 1.3; | N, 4.6 |
| Found: | C, 39.7; | H, 1.5; | N, 4.8 |

EXAMPLE 2

Perfluoroheptylbenzothiazole [$R^1 = CF_3(CF_2)_6-$; $R^2$-$R^5$ = H]

Part A

A solution of 7.35 g. (0.058 mole) of o-aminothiophenol in 175 g. of tetrahydrofuran was treated with 37 ml. of a 1.6 molar solution of butyllithium in n-hexane. The solution was cooled to 5° C. and 25.4 g. (0.059 mole) of perfluorooctanoyl chloride added slowly. The mixture was cooled to control the exothermic reaction at 5–10° C. When the addition was complete, the mixture was allowed to warm to room temperature and the solvent removed at water pump pressure. The crude product was a crystalline solid. Recrystallization from methylene chloride/hexane yielded 23.5 g. of S-(o-aminophenyl)perfluorothiooctanoate, melting at 63°–65° C.

Anal. Calc'd. for

| | | | |
|---|---|---|---|
| $C_{14}H_6F_{15}NOS$: | C, 32.3; | H, 1.16; | N, 2.68 |
| Found: | C, 32.4; | H, 1.10; | N, 2.90 |
| | 32.3 | 0.99 | 2.79. |

Part B

The ester from Part A (23.0 g., 0.44 mole) was heated at 190° C. in a vacuum apparatus as described in Example 1-B. The distillate was dissolved in methylene chloride, washed, filtered and dried. The solvent was evaporated to yield 29.8 g. of a crystalline solid. Recrystallization from methylene chloride/hexane yielded 23.5 g. of 2-perfluoroheptyl-benzothiazole, melting at 63°–65° C.

Anal. Calc'd for

| | | | |
|---|---|---|---|
| $C_{14}H_4$ | | | |
| Found: | C, 33.4; | H, 0.65; | N, 2.70 |

EXAMPLE 3

2-(1'-perfluorophenoxyperfluoroethyl)benzothiazole [$R^1 = -CF(CF_3)OC_6c$ ; $R^2$ - $R^5$ = H]

Part A

Lithium-o-aminophenyl mercaptide was prepared in tetrahydrofuran solution (200 ml.) by addition of 71 ml. of 1.6 molar butyllithium in hexane to 14.3 g. (0.114 mole) of o-aminothiophenol. The mixture was then cooled to about 5° C. and 37.7 g. (0.114 mole) α-perfluorophenoxyperfluoropropionyl fluoride added slowly while cooling to control the exothermic reaction. The residue obtained on evaporation of the solvent remained an oil. This was dissolved in methylene chloride, washed thoroughly and dried over magnesium sulfate. The solution, filtered from the drying agent and evaporated thoroughly to remove solvent, yielded 41.4 g. of S-(o-aminophenyl)perfluoro(2-phenoxythiopropionate).

Anal. Calc'd. for

| | | | |
|---|---|---|---|
| $C_{15}H_6F_9NO_2S$: | C, 41.4; | H, 1.39; | N, 3.22 |

| Found: | C, 41.3; | H, 1.64; | N, 3.60 |
|---|---|---|---|
|  | 41.6 | 1.66 | 3.84. |

Part B

The ester of Part A (35.4 g., 0.08 mole) was heated in vacuum at 180°–210° C. until distillation ceased. Only part of the product distilled. The reaction vessel and the condenser were rinsed with methylene chloride. The methylene chloride solution was washed in turn with dilute alkali and water, then dried with anhydrous magnesium sulfate. Evaporation of the methylene chloride yielded 22.6 g. of a yellow oil. Fractionation in a spinning band column gave 14.1 g. of 2-(perfluoro-1'-phenoxybenzothiazole), boiling at 106°–110° C./1 mm.

Anal. Calc'd. for

| $C_{15}H_4F_9NOS$: | C, 43.2; | H, 0.97; | N, 3.35 |
|---|---|---|---|
| Found: | C, 43.3; | H, 1.33; | N, 3.27 |

EXAMPLE 4

2-(Perfluoro-1,4-dimethyl-2,5-dioxaoctyl)benzothiazole [$R^1 = CF(CF_3)OCF_2CF(CF_3)OC_3F_7$; $R^2 - R^5 = H$]

Part A

Addition of 200 ml. of a 1.6 molar hexane solution of butyllithium to a solution of 40.1 g. (0.32 mole) of o-aminothiophenol and 400 ml. of tetrahydrofuran yielded lithium-o-aminophenyl mercaptide. The mixture was cooled during the addition and a yellow-white precipitate formed. The mixture was cooled to 0° C. and 159.8 g. (0.32 mole) of perfluoro-2,5-dimethyl-3,6-dioxanonanoyl fluoride added over a 2.5-hour period while maintaining the temperature at 0°–10° C. The solution was concentrated to a small volume, diluted with methylene chloride and washed in turn with sodium hydroxide and water. The dried methylene chloride solution was filtered and the solvent removed in vacuum. This yielded 53.1 g. of S-(o-aminophenyl) perfluoro(2,5-dimethyl-3,6-dioxathiononanoate).

Anal. Calc'd. for

| $C_{15}H_6F_{17}NO_3S$: | C, 29.9 | H, 1.00; | N, 2.32 |
|---|---|---|---|
| Found: | C, 30.6; | H, 1.23; | N, 2.20 |
|  | 30.5 | 1.36 |  |

Part B

The ester of Part A was heated at 225° C. for 7 hours, during which time the removal of water was assisted by blowing a stream of nitrogen through the reactor. The resultant tan oil was distilled through a spinning band column to give 112.1 g. of colorless 2-(perfluoro-1,4-dimethyl-2,5-dioxaoctyl)benzothiazole, boiling at 69°–72° C. (0.03–0.05 mm).

Anal. Calc'd. for

| $C_{15}H_4F_{17}NO_2S$: | C, 30.8; | H, 0.69; | N, 2.32 |
|---|---|---|---|
| Found: | C, 30.6; | H, 0.95; | N, 2.58 |

EXAMPLE 5

2-(Perfluoro-1,4,7,10,13,16-hexamethyl-2,5,8,11,14,17-hexaoxaeicosyl)benzothiazole. {$R^1 = CF(CF_3)[OCF_2CF(CF_3)]_6F$; $R^2-R^5-H$}

Part A

Addition of 82 ml. of a hexane solution of butyl-lithium (1.6 molar) to 300 ml. of a tetrahydrofuran solution containing 17.5 g. of o-aminothiophenol yielded lithium-o-aminophenyl mercaptide. The mixture was cooled and 153.2 g. of perfluoro(2,5,8,11,14,17-hexamethyl-3,6,9,12,15,18-hexaoxaheneicosanoyl fluoride was added while maintaining the temperature at 5°–10° C. The reaction mixture was diluted with 1,1,2-trifluoro-1,2,2-trichloroethane (Freon F-113) to dissolve the product. This gave a gel or dispersion that separated slowly. The Freon extract was dried over magnesium sulfate, filtered, concentrated on a rotary evaporator at less than 1 ml. Hg. to give 133 g. of a hazy yellow oil, S-(o-aminophenyl) perfluoro(2,5,8,11,14,17-hexamethyl-3,6,9,12,15,18-hexaoxathioheneicosanoate.

Anal. Calc'd. for

| $C_{28}H_6F_{41}NO_7S$: | C, 26.3; | H, 0.47; | N, 1.10 |
|---|---|---|---|

| Found: | C, 26.2; | H, 0.87; | N, 1.17 |
|---|---|---|---|
|  | 26.1 | 0.85 |  |

Part B

The ester of Part A (121.1 g.) was placed in a 500-ml. flask attached by way of a long tube to a vacuum train. The vessel was evaporated and heated to 220° C. The material in the reactor "boiled" vigorously and colorless liquid refluxed in the long tube. After 4 hours at 220° C., the product was distilled in a Vigreaux column to give three fractions, all boiling at 122–130° C./10–13µ. Infrared analyses showed that all fractions were the expected benzothiazole containing a carbonyl compound impurity. The combined product (98 g.) was further heated at 280° C. for 10 hours in Hastelloy vessel. Distillation yielded 65 g. of 2-(perfluoro-1,4,7,10,13,16-hexamethyl-2,5,8,11,14,17-hexaoxaeicosyl)-benzothiazole, boiling at 150° C./0.8µ.

Anal. Calc'd. for

| $C_{28}H_4F_{41}NO_6S$: | C, 26.7; | H, 0.3; | N, 1.1 |
|---|---|---|---|
| Found: | C, 26.6; | H, 0.5; | N, 1.1. |

EXAMPLE 6

2-(heptafluoroisopropyl)benzothiazole ($R^1 = CF_3-\underset{F}{\underset{|}{\overset{CF_3}{\overset{|}{C}}}}-$; $R^2-R^5 = H$)

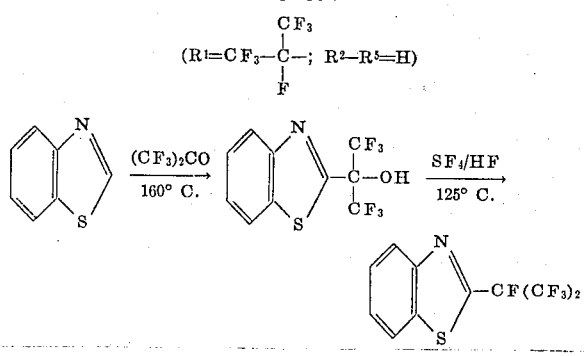

A. A mixture of 40.5 g. (0.296 mole) of benzothiazole and 125 g. of hexafluoroacetone was agitated at 160° C. in a pressure tube with Hastelloy C liner for 8 hours at 160° C. to give 83 g. of a brown solid. Recrystallization from hexane gave in 2 crops 76.8 g. (86%) of (2-benzothiazolyl)-(bis-trifluoromethyl)carbinol, m.p. 39°–42° C.

Anal. Calc'd. for

| $C_{10}H_5F_6NOS$: | C, 39.9; | H, 1.7; | N, 4.7 |
|---|---|---|---|
| Found: | C, 40.3; | H, 1.9; | N, 4.7 |

IR: 725, 749, 758 cm$^{-1}$;

NMR: o 7.95m (2H); o 7.44m (2H); o 6.26s (1H)

A mixture of 71 g. of the above carbinol, 75 g. and $SF_4$ and 15 g. of HF was agitated at 125° C. for 8 hours in a pressure tube with Hastelloy C liner. The dark oil was dissolved in methylene chloride; the solution was cautiously washed with aqueous sodium hydroxide, dried, and fractionated to give 57.9 g. (81% yield) of product, b.p. 83° C., 8 mm. Redistillation through a spinning band column gave 5 fractions, boiling at 210°–210.5° C. at 760 mm. Hg., all melting at ca. 30° C., and all contaminated with a few percent of liquid. Recrystallization from pentane at −78° C. gave 31.6 g. (44%) of white solid 2-(heptafluoroisopropyl)-benzothiazole. The $F^{19}$ nmr spectrum had a typical perfluoroisopropyl pattern, J = 8 Hz. The $H^1$ nmr spectrum had multiplets centered at o 8.17 (1H), o 7.90 (1H), o 7.45 (2H).

Anal. Calc'd for

| $C_{10}H_4F_7NS$: | C, 39.6; | H, 11.3; | N, 4.6 |
|---|---|---|---|
| Found: | C, 39.9; | H, 1.4; | N, 4.5. |

Substituted thiazoles of this invention are stable to heat and unreactive toward metals. Their heat stability is illustrated by the following two examples.

Example A

Samples of the 2-perfluoropropylbenzothiazole of Example 1-B were sealed in glass ampoules and heated in a Carius furnace at (1) 400° C., (2) 450° C., (3) 500° C. for 30 minutes. Slight discoloration occurred in tests (1) to (3), most of which appeared at the glass/liquid/gas junction. Sample (1) was reheated to 550° C. for 30 minutes. Discoloration appeared to have increased somewhat. An infrared spectrum of this test material was identical in all essentials with that of the original material (N.B. A2294-15,55).

Example B

A sample of the 2-perfluoropropylbenzothiazole of Example 1 was heated in an open tube in an oil bath at 220° C. Slight coloration occurred in a few minutes but no increase in color was evident after 16 hours. Parallel tests which contained (1) aluminum shot, and (2) copper wire, showed similar slight discoloration. In test (2) the copper wire was brightened (N.B. A2294-61).

The substituted thiazoles of this invention are useful as power fluids, hydraulic fluids, heat transfer fluids and lubricants as discussed below.

Power Fluids. Certain of these substituted thiazoles have properties which make them particularly suitable for use as power fluids in Rankine-cycle turbines (Table I).

TABLE I

DESIRED PROPERTIES FOR RANKINE-CYCLE TURBINE FLUIDS vs. PROPERTIES OF SUBSTITUTED THIAZOLES

| Property | Desirable Range | Properties of Thiazole 1* |
|---|---|---|
| b.p. | 150°–250° C. | 200° C. |
| m.p. | <25° | ≈ 20° C. |
| $T_c$ | 175° C. or more above b.p. | 399° C. |
| Mol. wt. | 200–500 | 203 |
| Thermal stability | 30 days at 100° C. above b.p. | 400° C., 1 day |

*Product of Example 1-B

Hydraulic fluids. Stability, chemical intertness, low viscosity, low flammability, and low compressibility are required. The product of Example 1-B is particularly suitable for this application. Its compressibility, determined by measuring the change of volume with compression, gave the following values.

| p.atm. | V, % | p, atm. | V, % |
|---|---|---|---|
| 100 | 0.86 | 600 | 3.76 |
| 200 | 1.64 | 700 | 4.17 |
| 300 | 2.20 | 800 | 4.60 |
| 400 | 2.73 | 900 | 5.00 |
| 500 | 3.24 | 1000 | 5.40 |

Lubricants. Compounds in the intermediate molecular weight range (800–8,000) are excellent temperature-stable lubricants. For example, the product of Example 5-B has good lubricating properties, and it suffers little or no decomposition when heated at 280° C. Use of polar substituents on the aromatic ring promotes adherence to the surfaces being lubricated.

Heat transfer fluids. The liquids are well suited to use as coolants or as working fluids in heat pipes.

We claim:

1. A compound of the formula

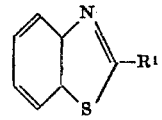

wherein $R^1$ is

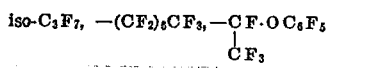

—CF(CF$_3$)[OCF$_2$CF(CF$_3$)]$_n$OCF$_2$CF$_2$CF$_3$ or —CF$_2$[OCF$_2$CF$_2$]$_n$OCF$_2$CF$_3$, and wherein n is 1 to 10.

2. 2-Perfluoroheptylbenzothiazole, the compound of claim 1, wherein $R^1$ is —(CF$_2$)$_6$CF$_3$.

3. 2-(1'-Perfluorophenoxyethyl)benzothiazole, the compound of claim 1, wherein $R^1$ is —CF(CF$_3$)—O—C$_6$F$_5$.

4. 2-(Perfluoro-1,4-dimethyl-2,5-dioxaoctyl)benzothiazole, the compound of claim 1, wherein $R^1$ is —CF(CF$_3$)OCF$_2$CF(CF$_3$)OC$_3$F$_7$.

5. 2-(Perfluoro-1,4,7,10,13,16-hexamethyl-2,5,8,11,14,17-hexaoxaeicosyl)benzothiazole, the compound of claim 1, in which $R^1$ is —CF(CF$_3$)[OCF$_2$CF(CF$_3$)]$_6$F.

6. 2-(Heptafluoroisopropyl)benzothiazole, the compound of claim 1, in which $R^1$ is iso—C$_3$F$_7$.

* * * * *